(12) United States Patent
Braun et al.

(10) Patent No.: US 8,180,833 B2
(45) Date of Patent: May 15, 2012

(54) MANAGING WORKING SET IN AN EXTENSIBLE MESSAGE TRANSFER SYSTEM

(75) Inventors: David A. Braun, Redmond, WA (US); Daniel D. Longley, Bellevue, WA (US); Malcolm E. Pearson, Kirkland, WA (US); Steven D. White, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/068,583

(22) Filed: Feb. 28, 2005

(65) Prior Publication Data

US 2006/0195531 A1    Aug. 31, 2006

(51) Int. Cl.
*G06F 15/16* (2006.01)
(52) U.S. Cl. ................................ 709/206; 709/205
(58) Field of Classification Search .................. 709/205, 709/206
See application file for complete search history.

(56) References Cited

U.S. PATENT DOCUMENTS

| | | | | |
|---|---|---|---|---|
| 6,192,396 B1 | 2/2001 | Kohler | ............ | 709/206 |
| 6,393,464 B1 | 5/2002 | Dieterman | .......... | 709/206 |
| 6,529,942 B1 * | 3/2003 | Gilbert | ........... | 709/206 |
| 7,058,641 B1 | 6/2006 | Franz | ............. | 707/101 |
| 7,076,241 B1 * | 7/2006 | Zondervan | ......... | 455/412.1 |
| 7,130,887 B2 | 10/2006 | Goldberg | .......... | 709/206 |
| 7,584,251 B2 | 9/2009 | Brown et al. | | |
| 7,730,140 B2 | 6/2010 | Braun et al. | | |
| 2002/0147783 A1 | 10/2002 | Kuth | | |
| 2003/0028580 A1 | 2/2003 | Kucherawy | .......... | 709/101 |
| 2008/0052324 A1 | 2/2008 | Choubey et al. | | |

OTHER PUBLICATIONS

U.S. Appl. No. 11/068,549, filed Feb. 28, 2005, Braun, D.A. et al.
U.S. Appl. No. 11/067,776, filed Feb. 28, 2005, Braun, D. A. et al.
Mimesweeper, "CS MAILsweeper for SMTP 4.3 Service Pack 2," Unusual Publishing LTD., 0911 712004, ©1998-2004, p. 1-24.
United States Patent and Trademark Office: Non-Final Office Action dated Jan. 9, 2008, U.S. Appl. No. 11/067,776.
United States Patent and Trademark Office: Final Office Action dated Jul. 9, 2008, U.S. Appl. No. 11/067,776.
United States Patent and Trademark Office: Non-Final Office Action dated Mar. 9, 2009, U.S. Appl. No. 11/067,776.
United States Patent and Trademark Office: Non-Final Office Action dated Jul. 7, 2008, U.S. Appl. No. 11/068,549.
United States Patent and Trademark Office: Final Office Action dated Jan. 8, 2009, U.S. Appl. No. 11/068,549.
United States Patent and Trademark Office: Non-Final Office Action dated Aug. 18, 2009, U.S. Appl. No. 11/068,549.
United States Patent and Trademark Office: Final Office Action dated Nov. 24, 2009, U.S. Appl. No. 11/067,776.

\* cited by examiner

*Primary Examiner* — Adnan Mirza
(74) *Attorney, Agent, or Firm* — Woodcock Washburn LLP

(57) ABSTRACT

Within a mail transfer agent of a message transfer system, a message is received and if the recipient entity resolves to a number of recipients exceeding a specified quantity, the original message is not processed. Instead, at least two messages are created, with each of the created messages addressed to a subset of the original set of recipients. The created messages are returned to the calling module for processing.

18 Claims, 11 Drawing Sheets

MANAGING WORKING SET IN AN EXTENSIBLE MESSAGE TRANSFER SYSTEM

CROSS-REFERENCE TO RELATED CASES

This application is related in subject matter to U.S. patent application Ser. No. 11/067,776, filed herewith entitled "Bifurcation of Messages in an Extensible Message Transfer System", and to U.S. patent application Ser. No. 11/068,549, filed herewith, entitled "Reprocessing of Messages in an Extensible Message Transfer System".

FIELD OF THE INVENTION

The invention relates to the delivery of messages in a computer system and in particular to an extensible e-mail messaging system in which messages can be bifurcated within a mail transfer agent to facilitate extensibility and/or manage working set.

BACKGROUND OF THE INVENTION

While the flow of messages through a delivery system seems simple: a message flows in, the message flows out, in practice, message delivery is often more difficult than it may at first glance appear. One type of message delivery is e-mail, electronic mail exchanged via communication between computers over a network. There are a number of commercially available e-mail systems including Microsoft's Exchange, IBM's Lotus Notes, Sendmail, Postfix and others.

The delivery of e-mail generally requires the use of a Mail User Agent (MUA), a client program that enables a user to send and receive e-mail, a Mail Transfer Agent (MTA), a server program that enables e-mail transfers from one machine to another and a Mail Delivery Agent (MDA), a program used by the MTA to put mail content into a user's mailbox or to transport e-mail to another MTA, and possibly a Mail Retrieval Agent (MRA), a program or service that fetches mail content from a mailbox on a remote server and passes it to an MUA. In some Message Transfer Systems an MTA does not actually deliver e-mail: it prepares a message (e.g. by insuring that the envelope is acceptable to the receiving server) and calls an MDA to physically transport the message. SMTP (Simple Mail Transfer Protocol) is a protocol commonly used for sending and receiving e-mail.

SMTP has the capability to transport e-mail across networks. A network may consist of mutually-TCP-accessible hosts on the public Internet, mutually-TCP-accessible hosts on a firewall-isolated TCP/IP Intranet, or hosts in some other LAN or WAN environment utilizing a non-TCP transport-level protocol. Using SMTP, a process can transfer e-mail to another process on the same network or to some other network via a relay or gateway process accessible to both networks. Thus, an e-mail message may pass through a number of intermediate relay or gateway hosts on its path from sender to ultimate recipient. SMTP is independent of the particular transmission subsystem, requiring only a reliable ordered data stream channel.

In common usage, the two hosts participating in an SMTP transaction are described as the "SMTP-sender" or the "SMTP client" and "SMTP-receiver" or "SMTP server". A given host may act both as server and client in a relay situation. The responsibility of an SMTP client is to transfer an e-mail message to one or more SMTP servers, or report its failure to do so. To transfer an e-mail message to an SMTP server, an SMTP client determines the address of an appropriate host running an SMTP server by resolving a destination domain name, and establishes a two-way transmission channel to that SMTP server. The SMTP client normally initiates an e-mail transaction consisting of a series of commands. The commands specify the originator and destination of the e-mail and the mail content (including any headers or other structure). SMTP replies are sent from the SMTP server to the SMTP client in response to the commands. The SMTP server that receives the transaction may be either the ultimate destination or an intermediate relay (that is, e-mail message transfer can occur in a single connection between the original SMTP-sender and the final SMTP-recipient, or can occur in a series of hops through intermediary systems).

SMTP servers and clients act as MTAs. MUAs are normally thought of as the sources and targets of mail. At the source, an MUA might collect mail to be transmitted from a user and hand it off to an MTA; the final (delivery) MTA would be thought of as handing the mail off to an MUA (or at least transferring responsibility to it, e.g., by depositing the message in a "message store" via an MDA).

SMTP transports an e-mail message. A message includes an envelope and content. The SMTP envelope is sent as a series of SMTP protocol units including an originator address (to which error reports should be directed); one or more recipient addresses; and optional protocol extension material. An address is a character string identifying a user from whom mail is sent or to whom mail will be sent or a location into which mail will be deposited. A mailbox refers to the mail depository. The two terms mailbox and address are typically used interchangeably unless the distinction between the location in which mail is placed (the mailbox) and a reference to it (the address) is important. The SMTP mail content is sent in the SMTP DATA protocol unit: that is, the material transmitted after a DATA command is accepted and before the "end of data" indication is transmitted is referred to as message content or mail data. Message content includes message headers and a possibly-structured message body. Headers typically include subject (typically used for a summary of the contents of the message), the e-mail address of the sender, the e-mail address of the receiver, and local time and date when the message was sent. The body is the text message itself (the letter, to analogize with traditional mail), and may include a signature block at the end.

When the recipient of an e-mail message resolves to a plurality of recipients, as in the case of an e-mail addressed to a distribution list (mailing list, group, or alias), the address is expanded, that is, a copy of the message is forwarded or redistributed to each mailbox in the expanded list. Thus, receipt of a single e-mail message sent to "ALL EMPLOYEES" of a very large company may result in the explosion of that e-mail into tens, hundreds, thousands or even more messages to be delivered, potentially causing the messaging system to be overwhelmed by the number of messages to be sent. Alternatively, receipt of the message may result in a single e-mail addressed to a very large number of recipients. While sending a single message is efficient, if the single message is addressed to a very large number of recipients, system resources (such as memory, for example) may be overtaxed, potentially causing system slowdown or even failure. It would be helpful if there were a way to expand messages in a reasonably efficient, predictable way that does not overtax system resources.

There exists in the marketplace a demand for extensibility of e-mail systems. Users may, for example, want to have their e-mail evaluated by anti-spam software, anti-virus software or to be handled according to a set of policy rules and so on. It would be helpful if there were a way to provide users with extensibility so that a generic message transfer system could be customized to meet a company's particular needs without re-writing the message transfer software. It would also be helpful if there were a way to enable a single e-mail addressed to a number of recipients to be treated differently for some recipients as specified, for example, by a set of policy rules reflected in the coding of external modules that could "plug in" to the generic message transfer system. It would be helpful to provide these enhancements while protecting the users from potential deleterious effects that arise because of existing features in message delivery systems such as distribution list processing.

Sometimes a problem is detected as a message is being processed by an MTA. For example, the set of assumptions valid when the message was received by the MTA may have changed, system configuration may have changed, or some error condition may have occurred. Known systems attempt to keep track of the progress of the message, try to correct the problem as well as possible and resume processing from that point. This approach often leads to unpredictable and incorrect results. It would be helpful if there were a more predictable solution that is likely to result in successful delivery more often.

SUMMARY OF THE INVENTION

Within a mail transfer agent (MTA) of a message transfer system, a message is received and if the recipient entity resolves to a number of recipients exceeding a specified quantity, the original message is not processed as received. Instead, the original message as received is replaced by two or more messages which are created by the MTA, with each of the created messages addressed to a subset of the original set of recipients. The created messages are returned to the calling module for processing.

The MTA may include a scheduler that can call into the modules and pass mail from one module to the next. The modules of the MTA may provide various functionality related to processing messages. The MTA may also include or provide one or more points within the processing path where the message is accessible to external modules or extensibility agents. Extensibility agents may act to customize the generic message transfer system to, for example, customize the message system to meet the needs of a particular entity or organization. An extensibility agent may access, or access and modify, the message within the processing path of the message in the MTA. The number of messages generated by the MTA may be determined by an algorithm which is a function of one or more of the following: the size of the message, the number of the recipients and the resources of the particular computer on which the message transfer system is running.

The working set of each module thereby is managed: a balance is struck between sending one e-mail to each recipient (the greater the number of recipients, the more inefficient is this approach) and sending one e-mail with a very large number of recipients (efficient in terms of numbers of copies made but likely to overtax system resources).

If an error condition is detected during processing of an e-mail, processing of the e-mail is discontinued and a copy of the message is processed from the beginning of the processing path within the categorizer.

Messages include e-mail messages comprising an envelope and content.

A scheduler and a categorizer may enable one or more external modules to control bifurcation of a message as the message is processed within a Mail Transfer Agent (MTA). The MTA may receive messages for processing by one or more modules within the MTA. The MTA may also include or provide points at which external modules (for example, modules provided by an entity other than the entity providing the message transfer system/software) can access, or access and modify, the message as it is being processed by the MTA.

Modules may be internal (e.g., modules which are part of a categorizer component of the MTA) or external (e.g., modules which are not part of a categorizer component of the MTA). A scheduler may call or invoke a module and may pass a message to the module. A module may also call or invoke the scheduler and may pass a message to the scheduler. A call from a module to the scheduler may include a list of recipients for which a separate e-mail message is to be generated. The list of recipients may be a subset of the recipients on the original e-mail that was received. The scheduler may generate a new e-mail addressed to the subset of the recipients and return this new e-mail to the calling module. The scheduler may generate a second new e-mail addressed to the remaining recipients of the original e-mail and place the second e-mail on a job data structure (e.g., a job stack) for future processing. The second e-mail message may be accompanied by an indicator or identifier of the module which is to process the second e-mail. Any number of new e-mails, addressed to subsets of the recipients of the original e-mail, may be generated by the scheduler. For example, a third e-mail message may be generated addressed to a third subset of the original list of recipients, and so on, until all the recipients have been included on a generated e-mail message. Any required number of new messages may be generated by the scheduler.

Thus, to enable an external module to control bifurcation of e-mail messages within an MTA, an e-mail (addressed to an entity which resolves to a number of recipients) is received by an MTA, a copy of the e-mail is stored, and the message is processed by one or more modules within the MTA and also may be processed by one or more external modules (e.g., extensibility agents) at points within the processing path. The external agent may access or receive the e-mail addressed to a number of recipients, and may call an API within the scheduler with a subset of the recipients on the received or accessed e-mail. In response, the scheduler may return to the external module a new e-mail addressed only to the recipients listed on the call. This e-mail then continues to be processed. The scheduler may also generate additional new e-mails, addressed to the remaining recipients (i.e., the list of the original e-mail minus the ones to whom the first e-mail was addressed). These additional e-mails are placed on a job data structure for processing later.

If an error condition is detected during processing of an e-mail, processing of the e-mail is discontinued and a copy of the message is processed from the beginning of the processing path.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Figure 2A:
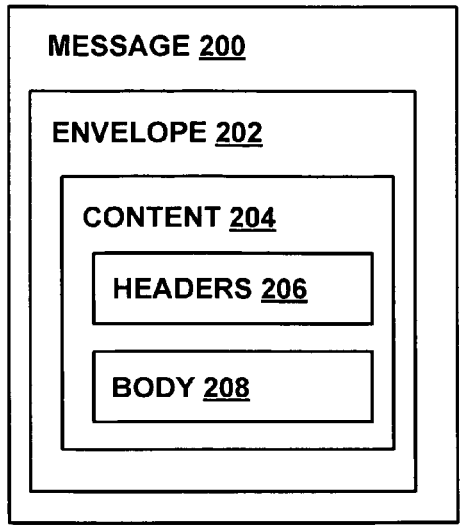
FIG. 2a is a block diagram illustrating an exemplary structure of a message.
Figure 2B:
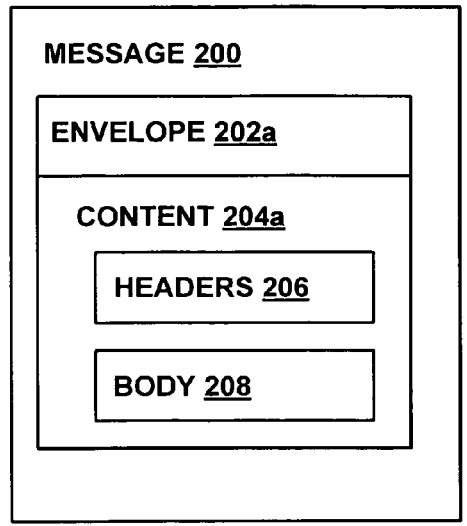
FIG. 2*b* is a block diagram illustrating a second exemplary structure of a message.
Figure 2C:
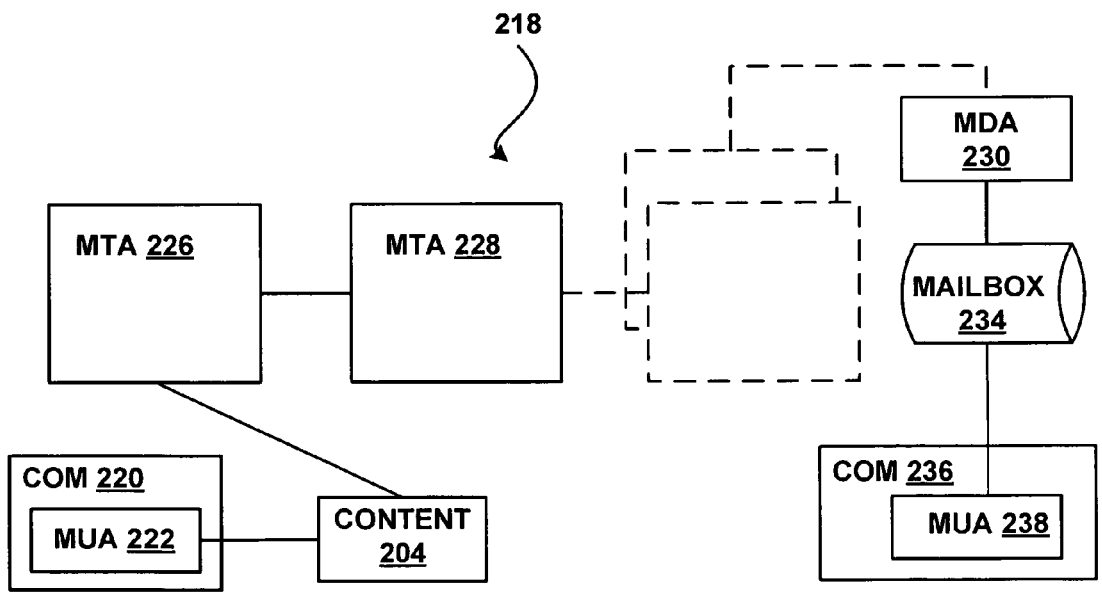
FIG. 2*c* is a block diagram illustrating an exemplary message delivery system.

Suppose Malcolm wants to send a message (e.g., an e-mail) to Dan. FIG. 2*a* illustrates an exemplary structure of a message 200. It will be appreciated that other equally valid message structures are possible, such as the one illustrated in FIG. 2*b* in which the envelope 202*a* is associated with the content 204*a* rather than containing the content. FIG. 2*c* illustrates an exemplary mail delivery system 218, although it will be appreciated that variations of system 218 abound.

Malcolm composes the body 208 of the e-mail using his MUA 222, addresses the e-mail to Dan (i.e., adds headers 206), and selects a "send" feature in his MUA 222. The e-mail content 204 is transferred from Malcolm's machine 220 to an MTA 226. The MTA 226 prepares an envelope 202 acceptable to the receiving server. The mail content 204 in its envelope 202 is transferred, if necessary, from MTA 226 to the next MTA 228. This process is repeated, as required, (represented in FIG. 2*c* by the dashed lines) until the e-mail arrives on Dan's local MTA. During the process of transporting the e-mail 200 through the network, the envelope 202 may be changed by each MTA that receives it. When the e-mail 200 finally arrives on Dan's local MTA, the envelope 202 is stripped off and the e-mail content 204 is placed in Dan's mailbox 234 by an MDA 230, where it can be retrieved by Dan's MUA 238, which may reside on Dan's machine 236 or elsewhere (not shown).

Now suppose Malcolm sends an e-mail to a distribution list, say to "ALL EMPLOYEES" of a very large company. Typically no single mailbox exists for ALL EMPLOYEES, instead, each of the employees of the company should receive a copy of Malcolm's e-mail. The MTA should perform the expansion of the ALL EMPLOYEES distribution list. The MTA could generate a new envelope (containing a copy of the e-mail content) for each person in ALL EMPLOYEES. If the number of recipients in ALL EMPLOYEES is very large, a large number of e-mails will be generated (possibly resulting in excessive network or storage consumption). Alternatively, the MTA could generate a single new envelope with all the recipient addresses of ALL EMPLOYEES on it. If the number of recipients in ALL EMPLOYEES is very large, processing this one e-mail could overtax system resources (possibly resulting in excessive memory usage, or excessive code complexity to deal with large recipient lists).

Now suppose Malcolm sends one e-mail addressed to a number of co-workers and that the company for whom Malcolm works has some special policy rules about sending e-mails. Suppose the company wants to add a particular disclaimer based on the type of recipient. Maybe managers get one type of disclaimer and developers get a second type of disclaimer. Suppose the message should be translated to French for employees living in France and suppose all attachments are to be stripped for all employees who are not managers or developers. It would be nice if this special processing could be performed by adding modules of processing at particular points within the processing path within the MTA for an e-mail addressed to a number of recipients for whom diverse processing rules apply.

Now suppose that as a message is being processed, the destination mailbox is moved from one server to another server. The message is very likely to be returned "undeliverable". Some embodiments of the invention may address these scenarios, among others.

Exemplary Computing Environment

Figure 1:
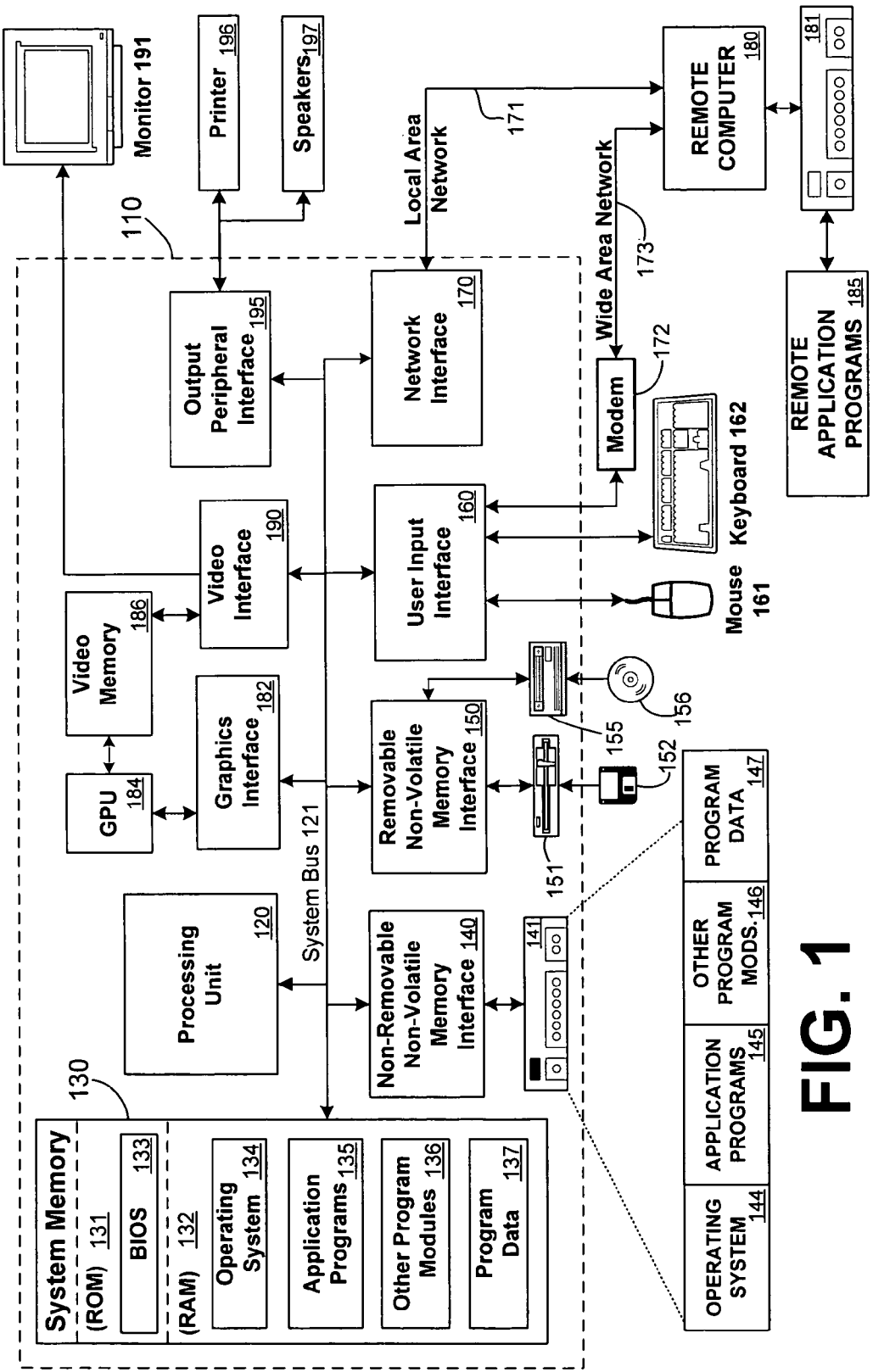
FIG. 1 is a block diagram showing an exemplary computing environment in which aspects of the invention may be implemented.

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Figure 3:
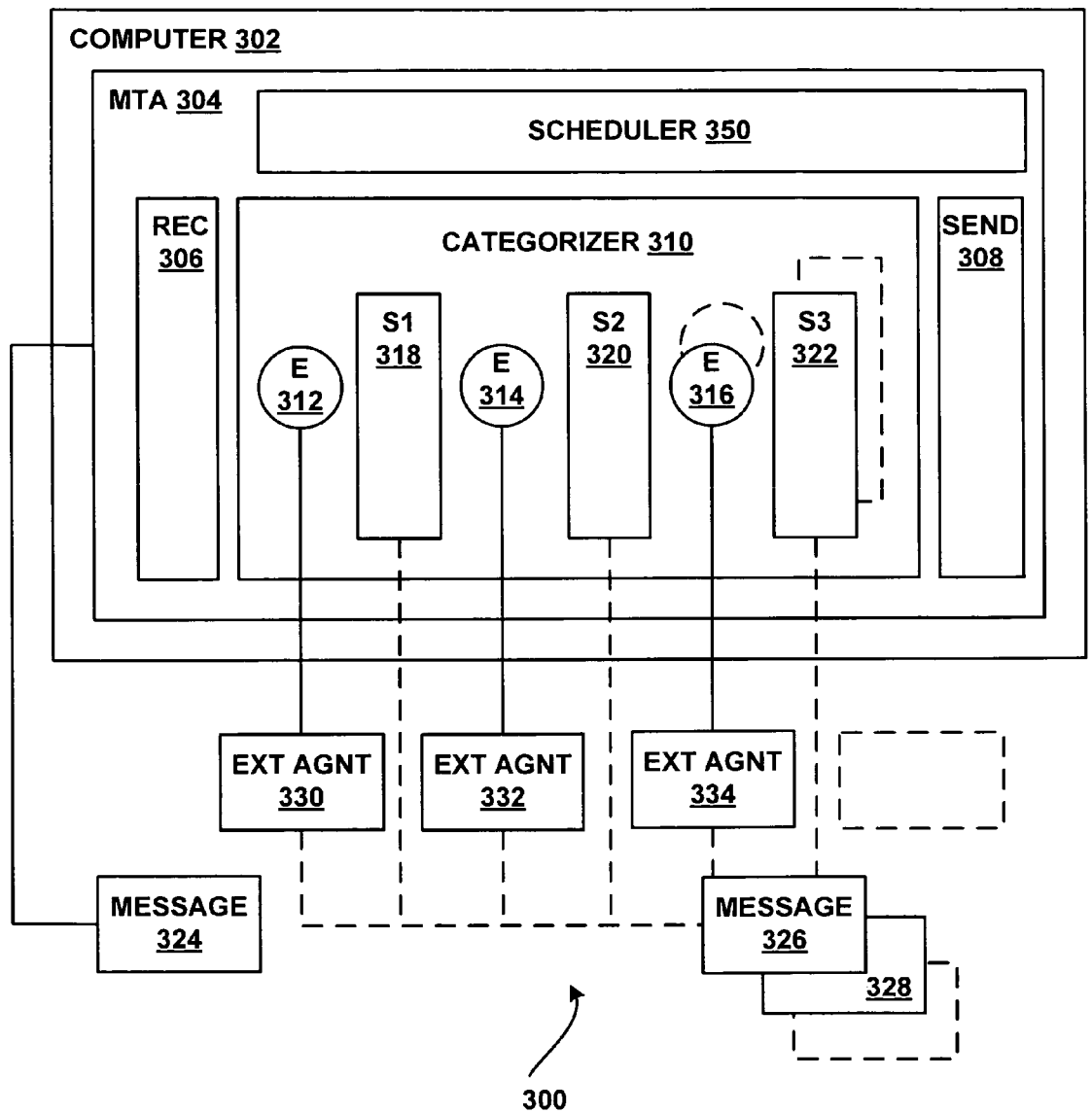
FIG. 3 is a block diagram of a system for bifurcating messages within a mail transfer agent in accordance with one embodiment of the invention.

Bifurcation of Messages within a Mail Transfer Agent (MTA) To Facilitate Extensibility and/or Manage Working Set FIG. 3 is a block diagram of a system for bifurcating messages within an MTA, in accordance with one embodiment of the invention. In FIG. 3 system 300 or portions thereof may reside on one or more computers as represented by computer 302. Computer 302 may be a computer such as computer 110 described with respect to FIG. 1.

FIG. 3 illustrates an MTA 304 in accordance with some embodiments of the invention. As illustrated in FIG. 3, MTA 304 may include one or more of the following components: a scheduler 350, a receive module 306, a send module 308 and a categorizer 310. The receive module 306, as the name suggests, may receive a message such as message 324 from an MDA, MIA or another MTA and may send the message 324 to the scheduler 350 for processing. The scheduler 350 may call or invoke modules within the categorizer 310 or external to the categorizer 310 to process the message 324 or to process a message or messages 326, 328, etc. derived from the received message 324. The scheduler 350 may also generate one or more messages from the received message 324 and pass one or more of these messages from module to module. The send module 308 similarly may send the message as received (message 324) or one or more messages 326, 328, etc. derived from message 324 to an MDA or another MTA.

The categorizer 310 may itself include one or more modules, components, stages or agents, as represented by stage 318, stage 320, stage 322, etc. in FIG. 3. Each module, component, stage or agent may perform particular functions or operations associated with message (e.g., e-mail) processing including but not limited to address resolution, routing, content conversion and so on. An address resolution stage, for example, may include the following:

determining whether the recipient address is known within the local area, and if the address is not known, sending the e-mail back to the person who sent it with an "undeliverable" message
 determining whether the mail can be delivered directly to the recipient with no expansion of the recipient address
 determining who should receive the e-mail if the address has to be expanded and so on.

Routing includes determining a path through the network to get the e-mail to its final destination. Content conversion may include converting the content of the message to a form required or desired by the recipient. For example, the character set of the original content may have to be converted to another character set or an image may have to be converted from one image compression format to another image compression format. Thus the categorizer in some embodiments performs functions related to the creation and modification of the message envelope and/or content and may itself include any number of modules performing any number of functions.

The categorizer may also provide points of extensibility, as represented in FIG. 3 by E 312, E 314, E 316, etc. Extensibility points may provide third parties or other entities points at which additional features may be added to the processing path. Examples of such features include but are not limited to: desired features not provided by the categorizer, anti-spam processing, anti-virus processing, journaling, communication blocking, rules or policies for mail distribution and mail flow management, as well as others. At an extensibility point such as E 312, E 314, E 316, etc., extensibility agents (e.g., such as extensibility agents 330, 332, 334, etc.) provided by a software vendor, customer, or third party, may be invoked. At extensibility points E 312, E 314, E 316, etc. extensibility agents such as agents 330, 332, 334, etc. may access or access and modify the message 324 or a message derived therefrom.

In operation, therefore, a receive component 306 of an MTA 304 may receive a message 324, and pass it to the scheduler 350. The scheduler 350 may call one or more modules within the categorizer 310 for processing and pass the called module a message for processing. The scheduler 350 may also call one or more modules external to the categorizer 310 for processing and pass the called external module a message for processing. Within the categorizer 310, categorizer components (e.g., stage 318, stage 320, stage 322, etc.) may further act on the message (e.g., message 324 or a message derived therefrom), potentially modifying the message and in concert with the scheduler 350, potentially generating additional messages (e.g., message 326, 328, etc.) therefrom. Similarly, extensibility agents (e.g., agents 330, 332, 334, etc.) external to the categorizer 310 may further act on message 324, potentially modifying message 324 and in concert with the scheduler 350 potentially generating additional messages (e.g., message 326, 328, etc.) therefrom. After processing by the categorizer and any extensibility agents that may exist, the messages are passed to the send component 308. Send component 308 may transfer the message to another MTA or to an NDA. Hence an exemplary processing path with the categorizer may be:

The scheduler 350 receives message 324 from receive component 306.

The scheduler 350 sends message 324 to stage 1 318 for processing.

Stage 1 318 receives message 324, performs its processing, generating a modified (or partially-processed) message 326.

Scheduler 350 passes modified/partially-processed message 326 to extensibility agent 332. Extensibility agent 332 performs its processing which involves further modifying modified/partially-processed message 326 to generate modified/partially processed message 328.

Scheduler 350 passes modified/partially processed message 328 to stage 2 320.

Stage 2 320 performs its processing on modified/partially processed message 328, further modifying message 328 creating message X (not shown).

Scheduler 350 passes message X to stage 3 322.

Stage 3 322 performs its processing message X, however the processing that stage 3 322 performs does not modify message X.

Therefore scheduler 350 passes message X to send component 308. It will be appreciated that the processing path described above is exemplary only and the invention as contemplated is not restricted to this or any other particular processing path, sequence, number of modules, etc.

To understand how additional messages could result from one incoming message, suppose that a CEO of Company X sends an e-mail to a distribution list, (e.g., a group or alias) "ALL EMPLOYEES". Typically, no mailbox exists for "ALL EMPLOYEES"; instead, each of the employees of the company should receive a copy of the CEO's e-mail. One way to send a copy of the CEO's e-mail to each employee is to create a new envelope for each employee, and place a copy of the e-mail content into each generated envelope. Hence, if Company X had 500,000 employees (i.e., "ALL EMPLOYEES" resolves to a list of 500,000 individual recipient addresses) 500,000 e-mails would be generated from the one received e-mail, if this plan were followed. The larger the content the more inefficient this would be.

Another way to send a copy of the CEO's e-mail to all the employees of Company X would be to generate a single envelope with all 500,000 recipient addresses on the envelope. This is efficient in terms of numbers of copies of the e-mail generated but presents processing problems—receiving one or more e-mails with very large numbers of recipients listed is likely to overwhelm system resources and may cause massive slow-downs or even may cause system failure.

In contrast, in some embodiments of the invention, in response to receiving a message sent to a recipient designation (e.g., distribution list, group or alias) representing a number of recipients exceeding a specified or configurable threshold, the categorizer resolves the recipient designation into a list of individual recipients, discards the envelope of the received message, and generates two or more new envelopes, each envelope including a subset of the complete list of individual recipients. In some embodiments of the invention, as soon as a new envelope is generated, the message is released for processing by the next component, module, agent or stage within or external to the categorizer.

It will be appreciated that the working set of the component, module, agent or stage receiving the generated envelopes and their associated content, is thereby reduced from the working set that would arise from receiving a single envelope including the entire expanded list of e-mail recipients. That is, in some embodiments of the invention a portion or subset of the recipients is removed from the working set. In some embodiments of the invention, new envelopes for the message are generated when the number of recipients on an envelope reaches some specified or configurable value (e.g., a single envelope may have a maximum of 10,000 recipients). In some embodiments of the invention, the number of new envelopes generated (and thus the number of e-mails resulting from distribution list expansion) is determined according to an algorithm that balances efficiency (e.g., number of envelopes generated, each containing a copy of the content) and potential processing load (e.g., effect on the system of processing a single e-mail with a large number of e-mail recipients) and system resources (e.g., available memory, etc.). In some embodiments of the invention, the algorithm is a function of one or more of: the number of recipients, the size of the content and available system resources. Hence, it will be appreciated that exercise of the invention strikes a balance between efficiency (generating a single copy of the message with all recipients on the envelope of the message, which in the case of very large numbers of recipients is likely to overwhelm system resources) and generating a copy of the message for each recipient (which is very inefficient and is likely to cause a system resources to be overwhelmed).

In some embodiments of the invention, upon generation of each new envelope, the envelope is passed to the next component of the categorizer for additional processing. In some embodiments of the invention, the envelope is passed to an extensibility point, (e.g., E 312, E 314, E 316, etc.), that is, the generated envelope is accessible by additional components such as extensibility agents.

Figure 4:
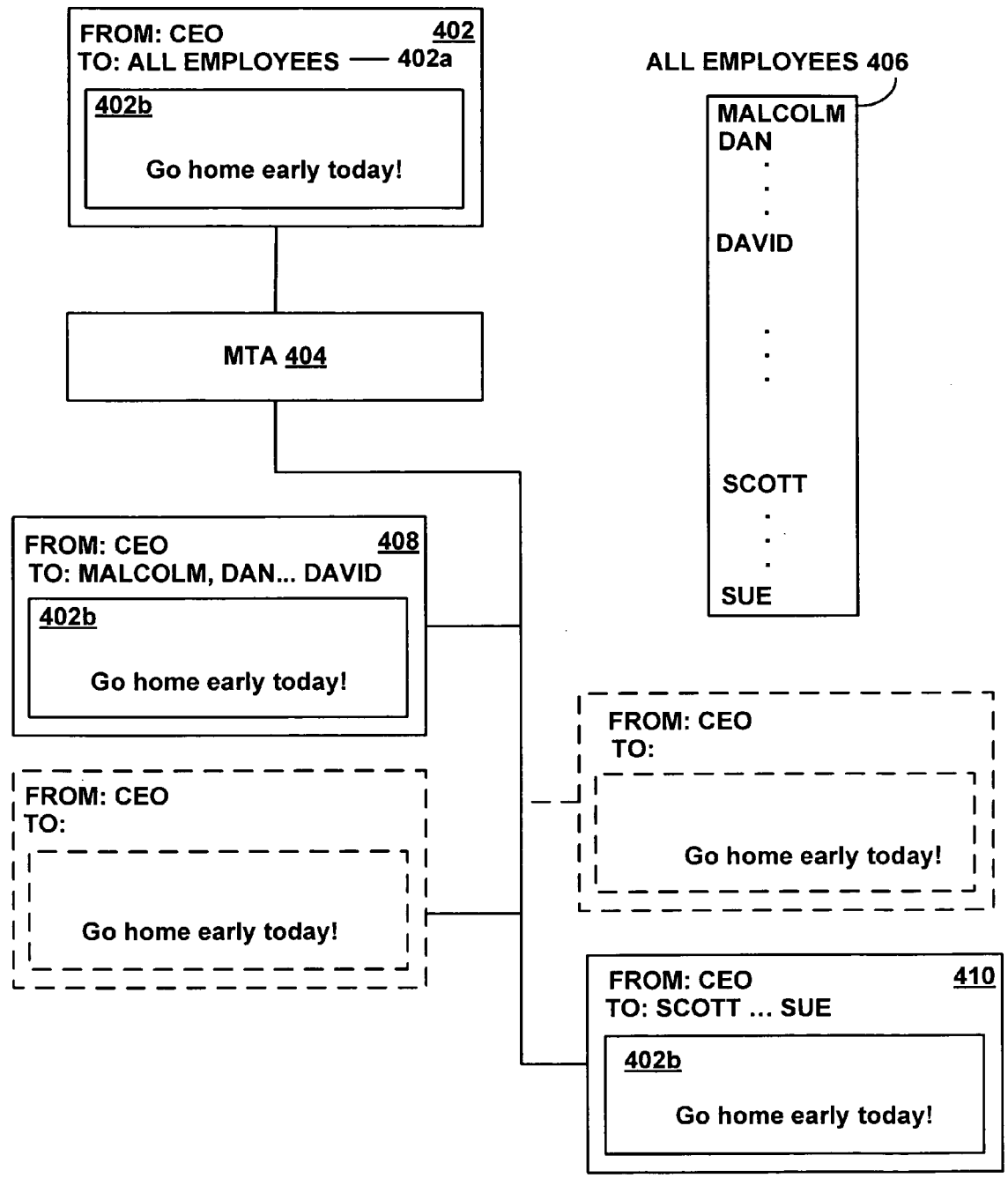
FIG. 4 is a block diagram illustrating the processing of an exemplary message within an extensible mail transfer agent in accordance with one embodiment of the invention.

FIG. 4 illustrates an example of envelope/message generation in accordance with some embodiments of the invention. In FIG. 4, in response to receiving an e-mail sent to the distribution list "ALL EMPLOYEES" 402a, representing a number of recipients, the number of recipients in the list exceeding some specified or configurable threshold, the categorizer resolves the distribution list "ALL EMPLOYEES" 402a into a list of individual recipients, 406, discards the envelope 402 of the received message, and generates two or more new envelopes, 408, 410, etc. the new envelopes each including a copy of the original content 402b, each envelope addressed to a subset of the entire list of individual recipients. In some embodiments of the invention, as soon as a new envelope is generated, (e.g., envelope 408 or envelope 410), the envelope is released for processing by the next component, module, agent or stage in the categorizer or external to the categorizer. Thus, it will be appreciated that the working set, represented in FIG. 4 as the list of names in ALL EMPLOYEES, has been reduced from the entire list (Malcolm to Sue) to only the employees listed between employee Malcolm and employee Dan for the first envelope and those employees between Scott and Sue for the second envelope.

Figure 6:
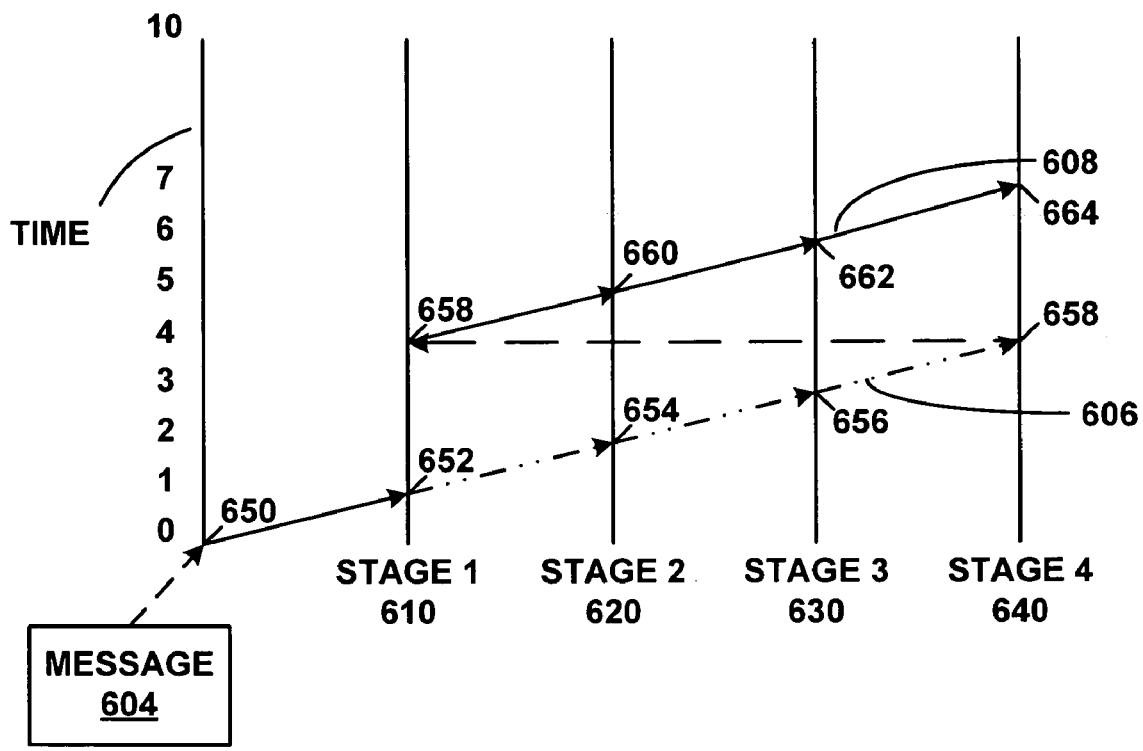
FIG. 6 is a flow diagram of a message as it is processed within an extensible mail transfer agent in accordance with one embodiment of the invention.

FIG. 6 illustrates the above concept for an exemplary message and processing path. In FIG. 6 a message 604 is received at time 0 (650) and is passed to a first stage, stage 1, 610. Stage 1 610 receives message 604 and generates therefrom two messages (whose processing paths are represented by lines 606 and 608 respectively) at time 1 652. The first message produced by stage 1 610 is passed to stage 2 620 at time 2 654. Stage 2 620 passes the first message produced by stage 1 610 to stage 3 630 at time 3 656. Stage 3 630 passes the first message produced by stage 1 610 to stage 4 640 at time 4 658. At time 5 660, the second message produced by stage 1 610 is passed to stage 2 620 for processing, the second message produced by stage 1 610 is passed to stage 3 630 at time 6 662, the second message produced by stage 1 610 is passed to stage 4 640 at time 7664 and so on. Thus it will be appreciated that at any one point in time, a reduced number of messages will be processed by any particular stage, that is the working set of each stage is reduced.

Figure 5:
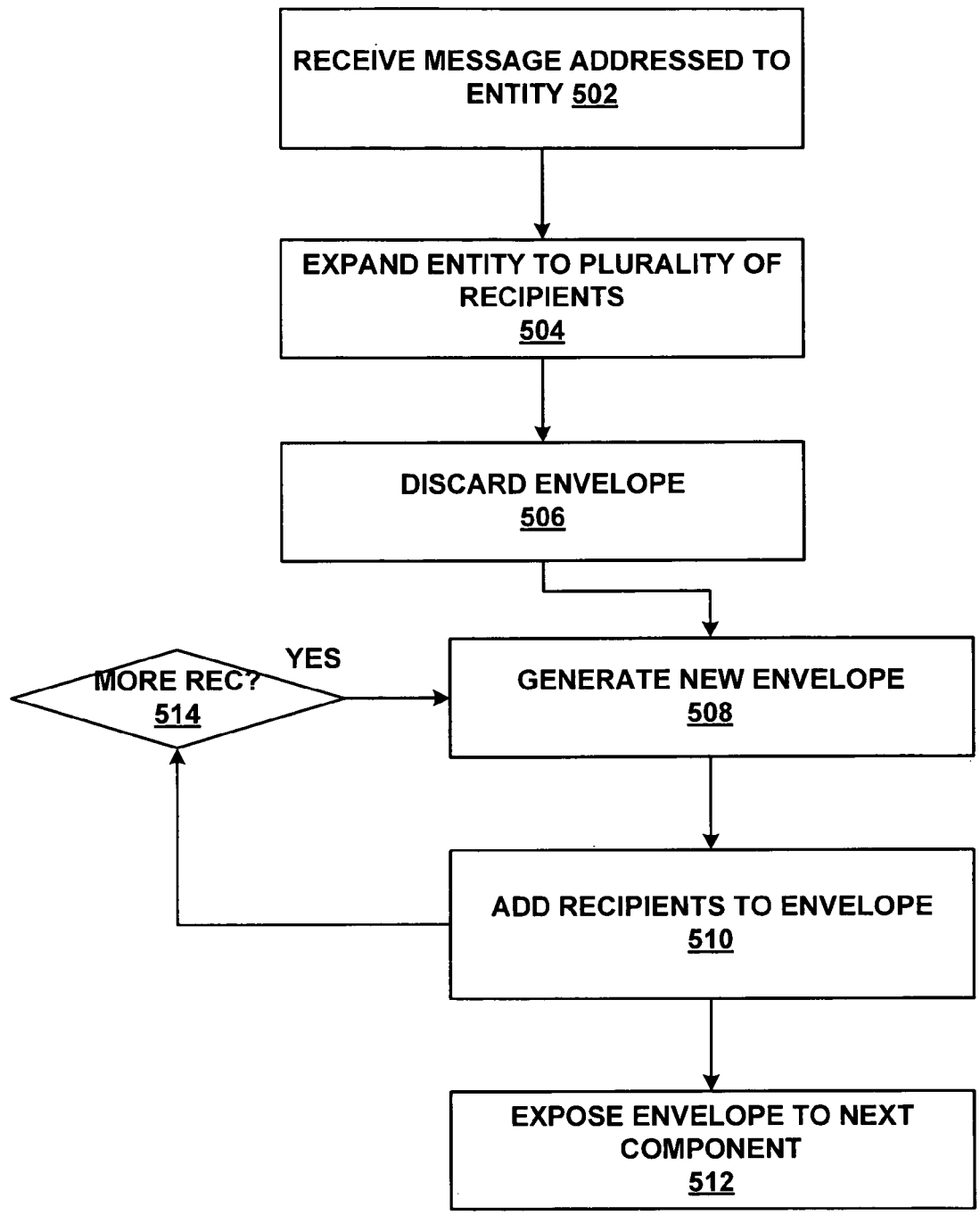
FIG. 5 is a flow diagram of a method for processing messages within an extensible mail transfer agent in accordance with one embodiment of the invention.

FIG. 5 illustrates a method of bifurcating messages within a mail transfer agent to facilitate extensibility in accordance with one embodiment of the invention. One or more of the following acts may be optional. At 502 a message is received by the mail transfer agent. At 504 the recipient entity of the message on the envelope is examined. In some embodiments of the invention, the message is addressed to an entity that resolves to a number of recipient addresses. The entity may be a distribution list such as a mailing list, group or alias or any other suitable entity which resolves to more than one recipient addresses. In some embodiments of the invention, the quantity of recipient addresses to which the entity resolves exceeds a specified or configurable value.

At 506 if the quantity of recipient addresses exceeds a specified or configurable value, the original envelope associated with the message received by the mail transfer agent is discarded. At 508 a new envelope is generated. The envelope may include or be associated with a copy of the content of the original received message. At 510 recipients are added to the envelope according to some function or algorithm as described above. Thus the new envelope may be addressed to a subset of the expanded list of recipient addresses to which the original entity resolved. At 512 the new envelope may be exposed to the next component of the mail transfer agent. At 514 if there are more recipients, another new envelope is generated (508) and processed. This process continues until there are no more recipients.

Re-processing a Message in Response to an Error Condition

Sometimes within a message delivery system, a message is received and is processed by one or more components, agents, modules or stages and somewhere within the processing path an error condition is detected. Problems with delivery of a message and error conditions may occur because decisions were made based on a set of assumptions now known to be invalid or from any number of circumstances. For example, an agent, component, module or stage may have incorrectly processed the message, a recipient may have been added after the routing was already determined (resulting in the e-mail to the added recipient lacking correct routing information), the mailbox of the recipient may have moved (e.g. from one server to another server so that when the message is attempted to be delivered, the mailbox does not exist where it is expected to be), the message processing may require a service not currently available and so on. Errors may also occur when the system configuration has changed (e.g., a new MTA has been added or an existing MTA has been removed or is not available so that the possible routing paths have changed; system characteristics of an MTA have changed so that the MTA that formerly required the envelope to be in one format now requires the envelope to be in another format, a recipient's mailbox has been moved from one server to another server, a component, module, agent or stage has incorrectly processed a message and so on) and for many other reasons. Existing systems may attempt to track the progress of the message, correct the problem as well as possible and resume processing. This approach is often unsatisfactory: inconsistent results may occur because the message continues to be processed under new assumptions or the resultant message may be undeliverable or may contain improperly modified contents.

In contrast, in accordance with some embodiments of the invention, a system for re-processing a message may, in response to detection of an error condition, generate a copy of the original message and reprocess the copy of the original message from the beginning of the processing path in the categorizer. In some embodiments, the content of a partially-processed message for which an error condition is detected is compared to the original message received by the MTA. If the content of the partially-processed message is identical to that of the original message, the partially-processed message may be sent back to the first component, agent, module or stage for processing from the beginning. If the content of the partially-processed message is not identical to that of the original message, the partially-processed message may be discarded, and a copy of the original message may be sent back to the beginning of the processing path for processing again. In some embodiments of the invention, the content is not compared, instead, a copy of the message is always generated and processing is repeated from the beginning.

In some embodiments of the invention, the message for which an error condition is detected is placed in a delay bin so that the message is not processed until some specified or configurable period of time has passed.

Figure 7:
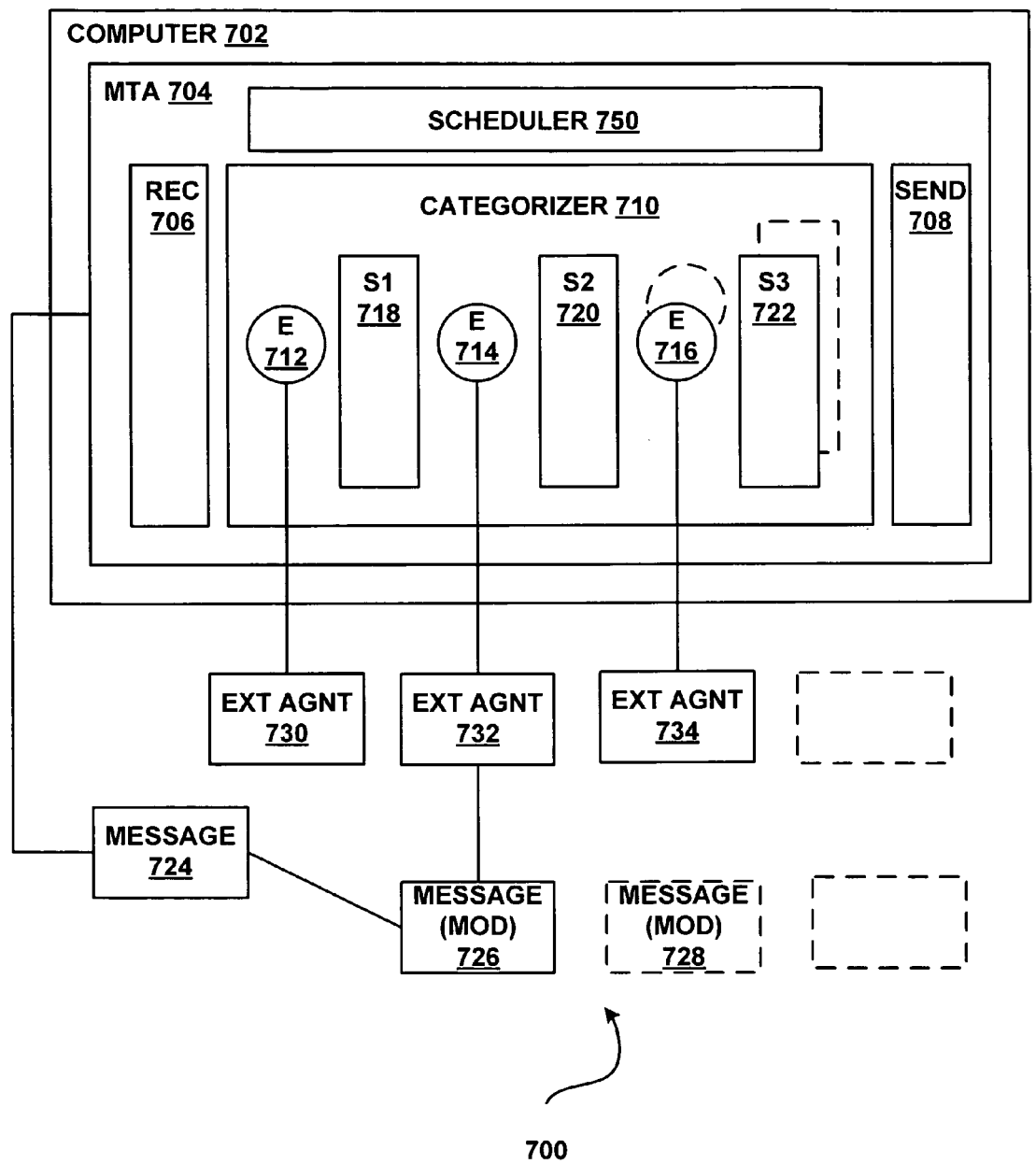
FIG. 7 is a block diagram of a system for re-processing a message within an extensible mail transfer agent in accordance with one embodiment of the invention.

FIG. 7 illustrates a system for reprocessing a message for which an error condition has been detected in accordance with one embodiment of the invention. In FIG. 7 system 700 or portions thereof may reside on one or more computers as represented by computer 702. Computer 702 may be a computer such as computer 110 described with respect to FIG. 1.

In FIG. 7 illustrates an MTA 704 in accordance with some embodiments of the invention. As illustrated in FIG. 7, MTA 704 may include one or more of the following components: a receive module 706, a send module 708 and a categorizer 710. The receive module 706, as the name suggests, may receive a message such as message 724 from an MDA, MUA or another MTA. The send module 708 similarly may send one or more messages derived from message 724 to an MDA or another MTA. The scheduler 750 may generate a copy of the original message and may pass messages between modules, as described above.

The categorizer 710 may itself include one or more modules, components, stages or agents, as represented by stage 718, stage 720, stage 722, etc. in FIG. 7. Each module, component, stage or agent may perform particular functions or operations including but not limited to address resolution, routing, content conversion and so on. In some embodiments of the invention, the categorizer 710 is substantially identical to the categorizer 310 described above. In some embodiments of the invention, the categorizer 710 is substantially identical to the categorizer 910 described below.

The categorizer may also provide points of extensibility, as represented in FIG. 7 by E 712, E 714, E 716, etc. Extensibility points may provide third parties or other entities points at which additional features may be added to the processing path. Examples of such features include but are not limited to: desired features not provided by the categorizer, anti-spam processing, anti-virus processing, journaling, communication blocking, rules or policies for mail distribution and mail flow management, as well as others. At an extensibility point such as E 712, E 714, E 716, etc., extensibility agents (e.g., such as extensibility agents 730, 732, 734, etc.) provided by a software vendor, customer, or third party, may be invoked. At extensibility points E 712, E 714, E 716, etc. extensibility agents such as agents 730, 732, 734, etc. may access or access and modify the message.

In operation, therefore, a receive component 706 of an MTA 704 may receive a message 724, and pass it to a scheduler 750 for processing. The scheduler 750 may store the message 724 before passing it to a component, stage, agent or module for processing. Within the categorizer 710, categorizer components (e.g., stage 718, stage 720, stage 722, etc.) and extensibility agents (e.g., agents 730, 732, 734, etc.) may further act on message 724, potentially accessing or accessing and modifying message 724 to generate one or more modified messages (e.g., modified messages 726, 728, etc.). After processing by the categorizer the messages are passed to the send component 708 to create a partially-processed message that differs from the original message, message 724, either in the content or in the envelope or in both. Send component 708 may transfer the message to another MTA or to an MDA.

If, however, an error condition is detected for message 724 or for modified messages 726, 728, etc. during any part of the processing of the message in the categorizer 710, the message may be re-processed from the beginning of processing in the MTA. In some embodiments of the invention, when an error condition is detected for message 724 or for modified messages 726, 728, etc., the partially-processed message is compared to the original message and if different, the partially-processed message is discarded, a copy of the original message is generated and the copy of the original message is processed from the beginning of the processing path within the MTA.

Similarly, in some embodiments of the invention, only the content of the partially-processed message is compared to the content of the original message and if different, the content of the partially-processed message is discarded and replaced by a copy of the content of the original message. The newly generated message is then processed from the beginning of processing path in the MTA. In other embodiments only the envelope of the original message is compared to the envelope of the partially-processed message and if different, the envelope of the partially processed message is discarded and replaced by a copy of the envelope of the original message. The newly generated message is then processed from the beginning of the processing path.

Figure 8:
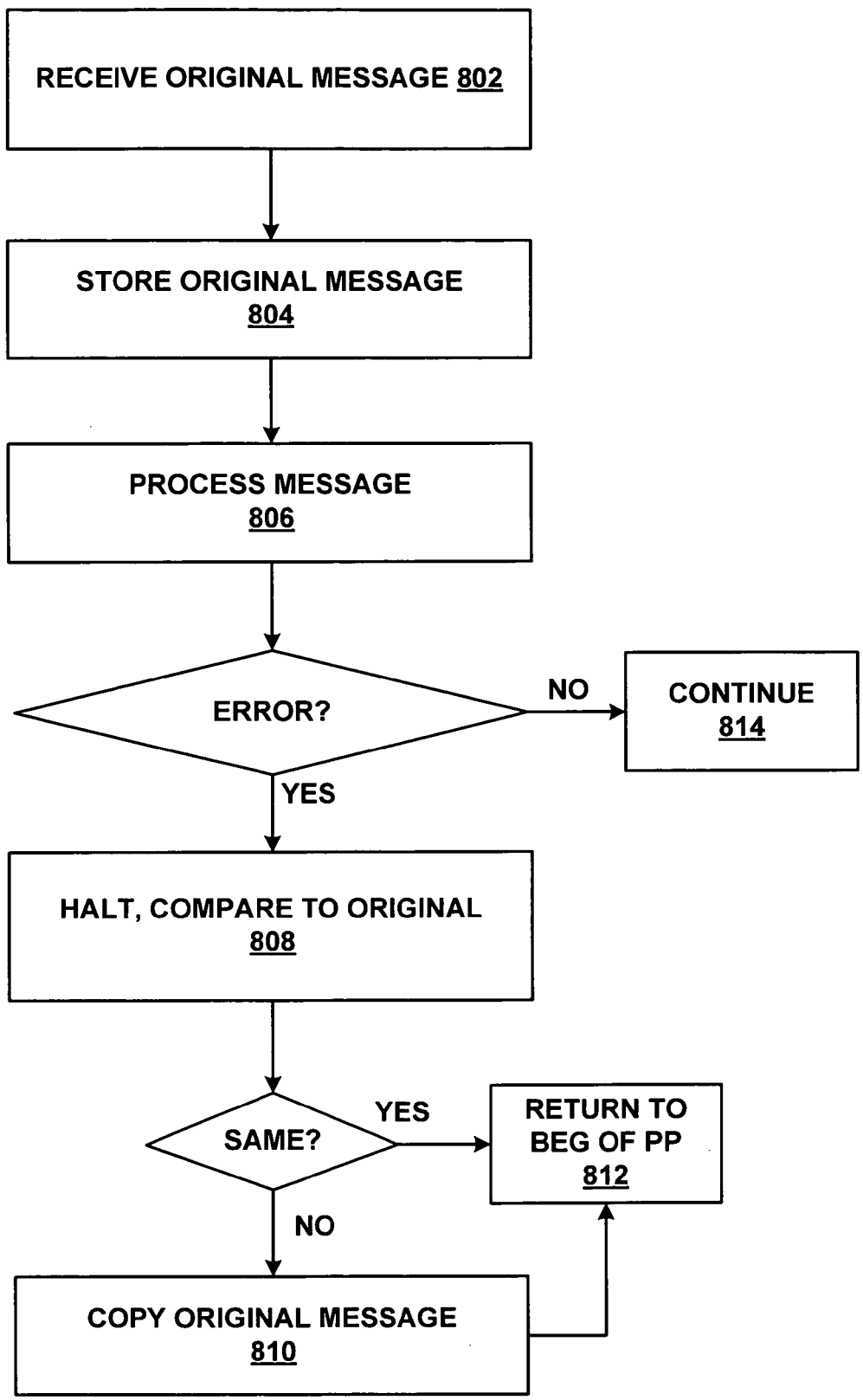
FIG. 8 is a flow diagram of a method for re-processing a message within an extensible mail transfer agent in accordance with one embodiment of the invention.

FIG. 8 is a flow diagram of a method for re-processing a message in an MTA in accordance with one embodiment of the invention. At 802 a message (referred to as the original message) is received by the receive component of the MTA. At 804 the original message is stored. At 806 processing of the message begins. Processing may be performed by a component, agent, module or stage of the categorizer or of an extensibility agent external to the categorizer and may access or access and modify the original message, generating a partially-processed message. If no errors are detected, processing continues at 814. At 808, if an error condition is detected, processing of the partially-processed message is halted. In some embodiments of the invention, the partially-processed message is compared to the original message. At 810 if the partially-processed message is not identical to the original message the partially-processed message is discarded and a copy of the original message is returned for processing to the beginning of the processing path (812). If the partially-processed message is identical to the original message, the partially-processed message is returned to the beginning of the processing path (812). In some embodiments of the invention, the message is delayed for a specified or configurable period of time before the message process is re-initiated (not shown).

In some embodiments of the invention, the comparison of the partially-processed message to the original message is not performed and a copy of the original message is always generated for re-processing from the beginning. In some embodiments of the invention, processing of the envelope is performed independent of processing of the content of the message. Therefore, a copy of the envelope only may be generated for reprocessing from the beginning, a copy of the content only may be generated for reprocessing from the beginning or some combination thereof may be generated (e.g., a portion of the envelope and all of the content, all of the envelope and a portion (e.g., only the body or only the headers) of the content, a portion of the envelope and a portion of the content and so on.

Enabling a User to Control Bifurcation of Messages in a Mail Transfer Agent (MTA)

Figure 9:
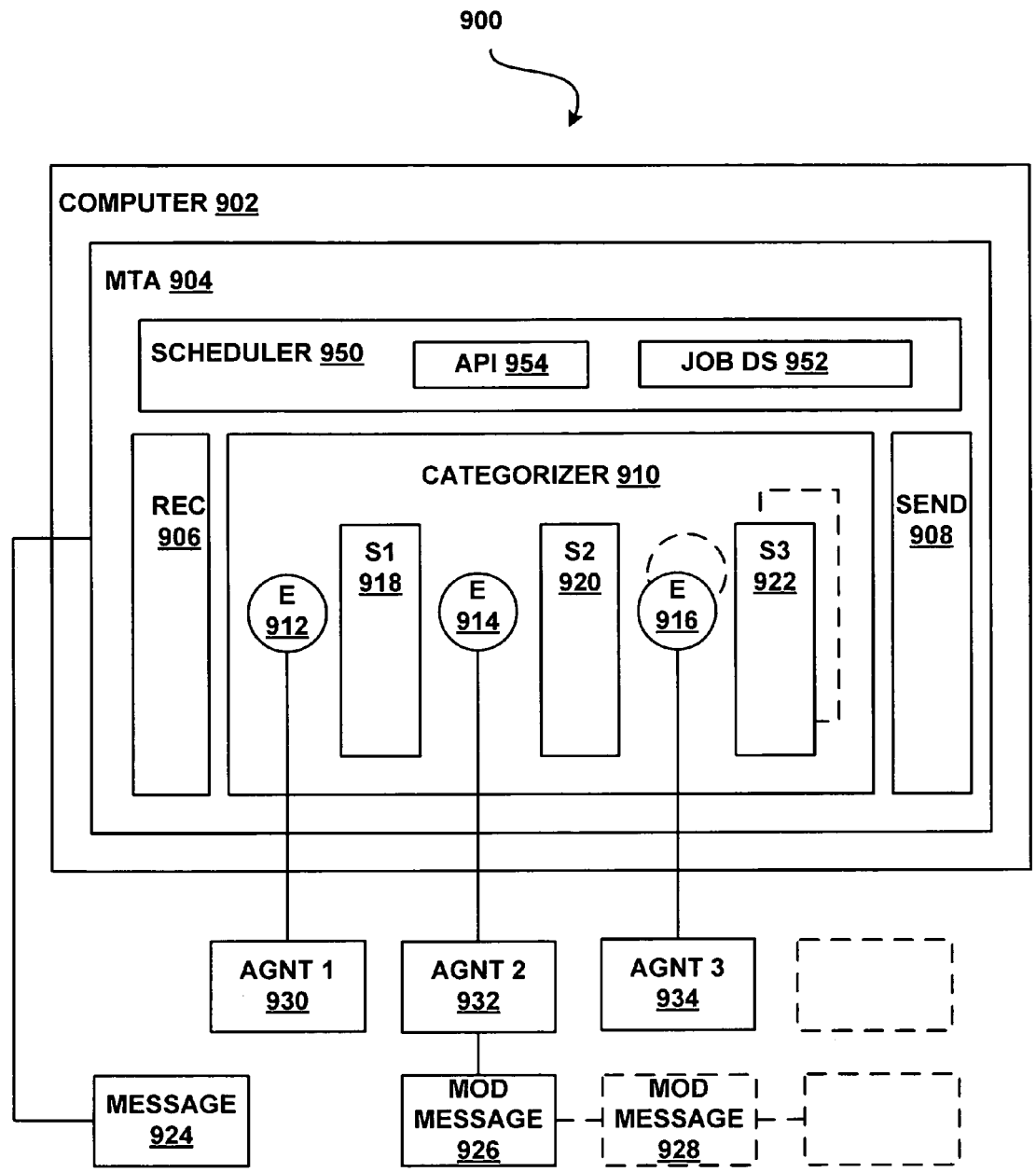
FIG. 9 is a block diagram of a system for enabling an extensibility agent to request the bifurcation of a message in a mail transfer agent in accordance with one embodiment of the invention.

FIG. 9 is a block diagram of a system for bifurcating messages within an MTA, in accordance with one embodiment of the invention. In FIG. 9 system 900 or portions thereof may reside on one or more computers as represented by computer 902. Computer 902 may be a computer such as computer 110 described with respect to FIG. 1.

FIG. 9 illustrates an MTA 304 according to one embodiment of the invention in which messages are bifurcated as directed by extensibility agents, thereby enabling customization of e-mail processing within an MTA. As illustrated in FIG. 9, MTA 904 may include one or more of the following components: a receive module 906, a send module 908 and a categorizer 910. The receive module 906, as the name suggests, may receive a message such as message 924 from an MDA, MUA or another MTA. The send module 908 similarly may send one or more messages 926, 928, etc. derived from message 924 to an MDA or another MTA.

The MTA 904 of FIG. 9 may include a scheduler 950 for processing messages stored in a job data structure 952. The job data structure 952 may be a queue, a stack, a database storing state or any other suitable data structure for storing messages for later processing. MTA 904 may include an API 954 that interfaces between scheduler 950 and modules within and external to the categorizer 910.

The categorizer 910 may itself include one or more modules, components, stages or agents, as represented by stage 918, stage 920, stage 922, etc. in FIG. 9. Each module, component, stage or agent may perform particular functions or operations including but not limited to address resolution, routing, content conversion and so on. An address resolution stage, for example, may include the following:

determining whether the recipient address is known within the local area, and if the address is not known, sending the e-mail back to the person who sent it with an "undeliverable" message determining whether the mail can be delivered directly to the recipient with no expansion of the recipient address determining who should receive the e-mail if the address has to be expanded and so on. Routing includes determining a path through the network to get the e-mail to its final destination. Content conversion may include converting the content of the message to a form required or desired by the recipient. For example, the character set of the original content may have to be converted to another character set or an image may have to be converted from one image compression format to another image compression format. Thus the categorizer in some embodiments performs functions related to the creation and modification of the message envelope and/or content and may itself include any number of modules performing any number of functions.

The categorizer may also provide points of extensibility, as represented in FIG. 9 by E 912, E 914, E 916, etc. Extensibility points may provide third parties or other entities points at which additional features may be added to the processing path. Examples of such features include but are not limited to: desired features not provided by the categorizer, anti-spam processing, anti-virus processing, journaling, communication blocking, rules or policies for mail distribution and mail flow management, as well as others. At an extensibility point such as E 912, E 914, E 916, etc., extensibility agents (e.g., such as extensibility agents 930, 932, 934, etc.) provided by a software vendor, customer, or third party, may be invoked. At extensibility points E 912, E 914, E 916, etc. extensibility agents such as agents 930, 932, 934, etc. may access or access and modify the message. In some embodiments of the invention, categorizer 910 is substantially similar to categorizer 310 or categorizer 710 described above.

In operation, therefore, a receive component 906 of an MTA 904 may receive a message 924, and pass it to a scheduler 950 for processing. The scheduler 950 may call one or more modules within the categorizer 910 for processing and pass the called module a message for processing. The scheduler 950 may also call one or more modules external to the categorizer 910 for processing and pass the called external module a message for processing. One or more additional messages may be generated from message 924, and passed to send component 908. Within the categorizer 910, categorizer components (e.g., stage 918, stage 920, stage 922, etc.) and extensibility agents (e.g., agents 930, 932, 934, etc.) may further act on message 924, or modified messages 926, 928, etc. potentially modifying these messages and potentially generating additional messages therefrom. After processing by the categorizer the messages are passed to the send component 908. Send component 908 may transfer the message to another MTA or to an MDA.

In accordance with some embodiments of the invention, an extensibility agent (e.g., agents 930, 932, 934, etc.) calls API 954 with a list of recipients. API 954 may compare the list of received recipients with the list of recipients of the original message (e.g., message 924) and generate a new e-mail envelope for only the list of received recipients, returning this message to the calling extensibility agent, and placing a message on the job data structure 952 for processing later. The message placed on the job data structure 952 for processing later may include the recipients of the original message except those listed in the message sent from the extensibility agent (e.g., agents 930, 932, 934, etc.) to the API 954.

Figure 10:
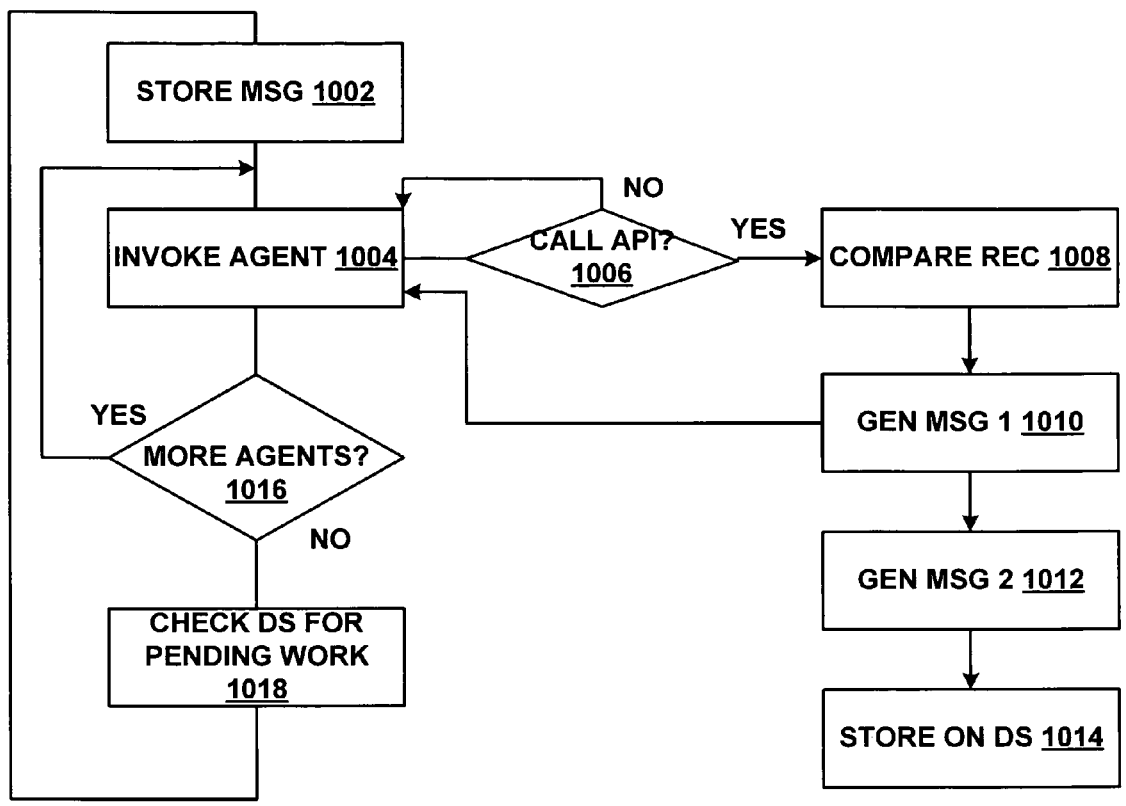
FIG. 10 is a flow diagram of a method for enabling an extensibility agent to request the bifurcation of a message in a mail transfer agent in accordance with one embodiment of the invention.

An exemplary process for enabling the bifurcation of a message to be controlled by an extensibility agent in accordance with some embodiments of the invention is illustrated in FIG. 10. In accordance with some embodiments of the invention, after receipt of a message by the receive component of the MTA, the original message is stored for future reference at 1002. The message may be stored by a component or module in the categorizer or may be stored by the scheduler. In the categorizer, the message may be processed by one or more components, agents or modules within the categorizer. The message may also be accessed at an extensibility point by one or more external agents and processed thereby.

In some embodiments of the invention the message is an e-mail message and is addressed to a number of recipients or to an entity such as a distribution list, mailing list, group or alias that may be expanded by, for example, an expansion module, to a number of recipients. In some embodiments of the invention, the recipients associated with the message are subject to a set of rules that apply to the content, routing or other characteristics of the e-mail.

At 1004 in some embodiments of the invention, an agent, component, module or stage is invoked. In some embodiments of the invention, the agent, component, module or stage is provided by a vendor, or by a third party and is meant to plug into an existing generic e-mail or messaging system in order to customize the generic e-mail or messaging system for a particular organization, client, business enterprise or other entity.

At 1006 a call may be made from the extensibility agent or other component, agent, module or stage, to an API for bifurcating messages. The call may include the name of the calling agent, a list of recipients for whom the call pertains and the name of the agent to whom the generated message should be returned.

At 1008 the list of recipients for the message is compared to list of recipients on the stored (original) message. A copy of the message addressed to only the recipients listed on the call is returned to the calling agent at 1010 and processing continues within the calling agent. Substantially simultaneously, a second message may be generated at 1012.

At 1012 the second message generated may be a copy of the original message listing only the remaining recipients, that is, the recipients listed on the second message may be the recipients of the original message except for those recipients listed by the agent in the call to the API. At 1014, the second message is stored on the job data structure. In some embodiments of the invention in addition to the message, the list of the remaining recipients, and the name of the calling agent, the name of the agent to whom the message should be returned is also stored.

Upon completion of processing within the agent, if there are more agents (1016) in the chain, processing continues at the next agent (1004). If there are no more agents (1016), at 1018, the job data structure is examined for messages to be processed and processing continues at the indicated agent.

Suppose for example that Company X has a number of policy rules concerning the content of and sending of e-mails from employees of Company X. For example, suppose the policy rules of Company X are the following:

put disclaimer 1 on all e-mails sent to vendors (V1, V2 and V3)
put disclaimer 2 on all e-mails sent to clients (C1)
strip attachments from e-mails sent to V1 and V2
translate content to French for French recipients Suppose further that the policy rules described above are implemented by extensibility agents agent 1 930, agent 2 932 and agent 3 934. Now suppose an e-mail (e.g., message 924) is sent from an employee of Company X to the following recipients: three vendors V1, V2, V3, one of whom is French (V1 is French), and client C1.

Figure 11:
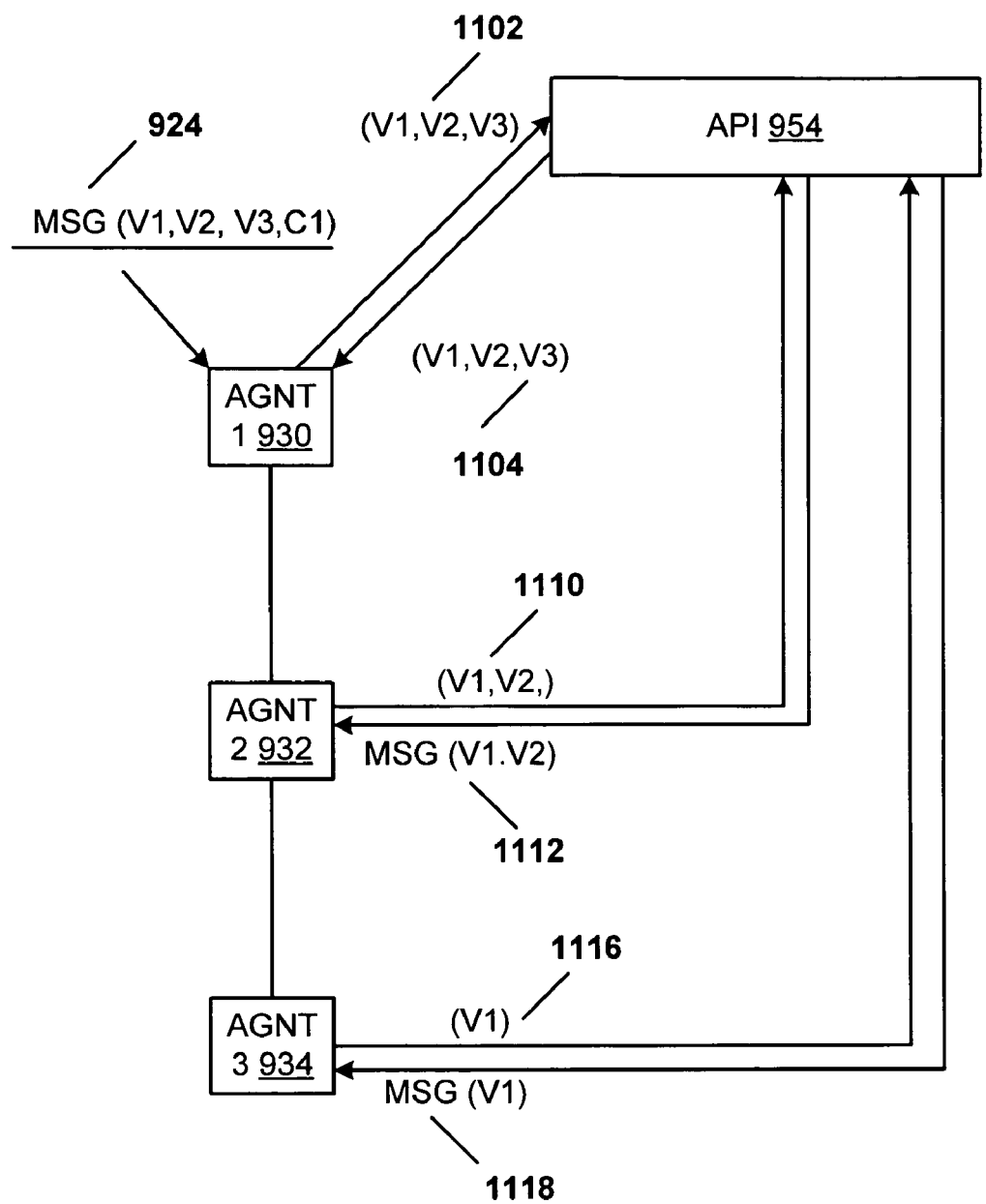
FIG. 11 is a data flow diagram of data in a mail transfer agent in accordance with one embodiment of the invention.

FIG. 11 illustrates the processing of the an exemplary message from an agent to a bifurcation API in accordance with some embodiments of the invention. For ease in understanding, the format of a message will be represented in FIG. 11 as MSG (recipient list), although it will be appreciated that the format of the message and the call made to the bifurcation API may be any suitable format. Hence a message to V1, V2, V3 and C1 is represented as MSG (V1,V2,V3,C1) in FIG. 11 and the format of a call to API 954 is represented in FIG. 11 as (recipient list) (e.g., (V1,V2,V3,C1)).

Referring now concurrently to FIGS. 9, 10 and 11, suppose that a message MSG (V1,V2,V3,C1) 924 is received by MTA 904. Scheduler 950 stores message 924 (FIG. 10, 1002). Suppose that extensibility agent 930 is invoked (FIG. 10, 1004) at extensibility point 912 and that extensibility agent 930 is responsible for putting disclaimers on e-mails. As the recipient list (V1,V2,V3,C1) includes both vendors and clients, extensibility agent 930 calls API 954 (FIG. 10, 1006) with the recipient list (V1,V2,V3) 1102. API 954 receives the recipient list (V1,V2,V3), 1102, compares the received recipient list with the recipient list of the original message, which was stored at 1002, and returns a message addressed only to V1, V2, V3 (e.g., MSG (V1,V2,V3) 1104 to agent 1 930 (FIG. 10, 1010). API 954 also stores a second message (MSG (C1) AGENT 1 1108) addressed to only those recipients of the original message not listed in the call 1102 (i.e., in the example, recipient C1) on the job data structure 1106

(FIG. 10, 1014). MSG (V1,V2,V3) 1104 is processed by agent 1 930 and passed on to agent 2 932 (FIG. 10, 1016 returning to 1104). Agent 2 932 receives MSG (V1,V2,V3) 1104 from agent 1 930. Suppose agent 2 932 is responsible for stripping attachments from e-mails to V1 and V2. In this case, agent 2 932 would send recipient list V1,V2 1110 to API 954 (FIG. 10, 1006), API 954 would compare recipients (FIG. 10, 1008), generate MSG (V1,V2) 1112 and send this message to agent 2 932 (FIG. 10, 1010), generate a second message 1114 (FIG. 10, 1012) and places the second message on the job data structure 952 (FIG. 10, 1014). The second message may list the remaining recipient V3 and would indicate the agent that should process this message (i.e., agent 3 934). After agent 2 932 processes MSG (V1,V2) 1112, MSG (V1,V2) 1112 would be processed by agent 3 934. Suppose agent 3 934 is responsible for translating the message to French. Because V1 is French, agent 3 934 would call API 954 listing recipient V1, 1116. API 954 returns a message with only recipient V1 1118 and puts a second message MSG (V2) AGENT n 1120 on the job data structure. After all the agents in the chain have been processed, the job data structure is accessed and the processing indicated performed. (For example, the message MSG (V2) AGENT n would be sent to agent n for processing.)

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed is:

1. A system for managing messages in a message transfer system, the system comprising at least one processor and at least one memory device communicatively coupled to said at least one processor, the memory device having stored thereon computer-executable instructions for instructing the processor to cause the following steps:
receiving and storing a single e-mail message addressed to a plurality of recipients, the single e-mail message comprising a content and an envelope, the content including a body and the envelope including a plurality of recipient addresses;
in response to determining that a number of the plurality of recipient addresses exceeds a specified threshold, determining a quantity of email messages to be derived from the single e-mail message, the quantity of e-email messages being a function of the number of the plurality of recipient addresses, a size of the e-mail message content, and available resources of the system;
generating the quantity of e-mail messages derived from the single e-mail message, the generated e-mail messages being addressed to respective subsets of the plurality of recipient addresses; and
processing the generated quantity of e-mail messages through a plurality of extensibility points configured to enable a plurality of modules external to the system to access and modify the generated quantity of e-mail messages.

2. The system of claim 1, wherein the extensibility point is operable for a first module to access at least one of the generated e-mail messages.

3. The system of claim 1, wherein the extensibility point is configured to customize a message transfer system.

4. The system of claim 1, wherein the generated quantity of e-mail messages comprises at least a first derived e-mail addressed to a first subset of the plurality of recipients and a second derived e-mail addressed to a second subset of the plurality of recipients.

5. The system of claim 1, wherein the single e-mail message is discarded.

6. A computer implemented method of managing working set in a message transfer system, comprising:
receiving an e-mail message by a mail transfer agent of the message transfer system, the received e-mail message being addressed to a plurality of recipients;
in response to determining that a number of the plurality of recipients exceeds a specified threshold, discarding the received e-mail message and determining, by the e-mail transfer agent, a quantity of e-mail messages to be derived from the received e-mail message, the quantity of e-mail messages being a function of a size of the received e-mail message, the plurality of recipients of the received e-mail message, and available resources of the mail transfer agent;
generating, by the mail transfer agent, the quantity of e-mail messages derived from the single e-mail message, the generated quantity of e-mail messages being addressed to respective subsets of the plurality of recipients; and
processing, by the mail transfer agent, the generated quantity of e-mail messages through a plurality of extensibility points within the mail transfer agent, the plurality of extensibility points configured to enable a plurality of modules external to the mail transfer agent to access and modify the generated quantity of e-mail messages.

7. The method of claim 6, wherein the message transfer system is a generic message transfer system and a first module customizes the generic message transfer system.

8. The method of claim 6, wherein said determining that the plurality of recipients exceeds the specified threshold is a function of a size of the received e-mail message.

9. The method of claim 6, wherein said determining that the plurality of recipients exceeds the specified threshold is a function of a quantity of the plurality of recipients and a size of the received e-mail message.

10. The method of claim 6, wherein the received e-mail message comprises an envelope and message content.

11. The method of claim 10, where the message envelope is discarded and a new message envelope is generated for the derived e-mail message.

12. The method of claim 6, wherein said determining that the plurality of recipients exceeds the specified threshold is a function of available system resources of the mail transfer agent.

13. The method of claim 10, wherein a plurality of envelopes are generated, each of the plurality of envelopes addressed to a subset of the recipients of the received e-mail.

14. A computer-readable storage device with computer-readable instructions stored thereon that, when executed by a computing device, cause the computing device to perform operations comprising:
   receiving an e-mail message within a mail transfer agent of a message transfer system, the received e-mail message being addressed to a plurality of recipients;
   determining that a number of the plurality of recipients exceeds a specified processing load, the specified processing load being a function of a size of the received e-mail message and a number of the plurality of recipients of the received e-mail message;
   determining a quantity of e-mail messages to be derived from the received e-mail message, the quantity of e-mail messages being a function of the plurality of recipients, a size of the received e-mail message, and available resources of the mail transfer agent;
   generating the quantity of e-mail messages derived from the received e-mail message, the generated quantity of e-mail messages being addressed to respective subsets of the plurality of recipients; and
   processing the generated quantity of e-mail messages through a plurality of extensibility points within the mail transfer agent, the plurality of extensibility points configured to enable a plurality of modules external to the mail transfer agent to access and modify the generated quantity of e-mail messages.

15. The computer-readable storage device of claim 14, further comprising instructions for:
   discarding an envelope of the received e-mail message and generating at least a first e-mail message comprising a content of the received e-mail message and a first envelope addressed to a first subset of the plurality of recipients and a second e-mail message comprising the content of the received e-mail message and a second envelope addressed to a second subset of the plurality of recipients.

16. The computer-readable storage device of claim 15, further comprising instructions for determining that the first subset and the second subset in combination comprise the plurality of recipients.

17. The computer-readable storage device of claim 16, further comprising instructions for discarding the first e-mail message and the second e-mail message and restarting processing of the received e-mail message in response to determining that an error condition has occurred.

18. The computer-readable storage device of claim 16, further comprising instructions for exposing an access point to the first e-mail message and the second e-mail message.

* * * * *